(12) United States Patent
Wadley et al.

(10) Patent No.: US 8,137,036 B2
(45) Date of Patent: Mar. 20, 2012

(54) CORING TOOL ALIGNMENT SYSTEM

(75) Inventors: Tracy F. Wadley, Hillsboro, OR (US);
Richard F. Keif, Lake Oswego, OR (US)

(73) Assignee: Sewer Tap Inc., Cornelius, OR (US)

( * ) Notice: Subject to any disclaimer, the term of this patent is extended or adjusted under 35 U.S.C. 154(b) by 495 days.

(21) Appl. No.: 12/333,251

(22) Filed: Dec. 11, 2008

(65) Prior Publication Data
US 2009/0169316 A1 Jul. 2, 2009

Related U.S. Application Data

(60) Provisional application No. 61/017,415, filed on Dec. 28, 2007.

(51) Int. Cl.
*B23B 35/00* (2006.01)
*B23B 47/28* (2006.01)

(52) U.S. Cl. ........ 408/1 R; 408/79; 408/115 R; 408/204

(58) Field of Classification Search ................ 408/1 R, 408/72 B, 79–83, 115 R, 115 B, 204, 206, 408/207, 209
See application file for complete search history.

(56) References Cited

U.S. PATENT DOCUMENTS

| | | | | |
|---|---|---|---|---|
| 169,353 A | * | 11/1875 | Grinnell | 408/1 R |
| 790,735 A | * | 5/1905 | Martin | 30/410 |
| 1,291,578 A | | 1/1919 | McPhail | |
| 1,477,364 A | * | 12/1923 | Kettler | 408/237 |
| 1,625,032 A | * | 4/1927 | Kettler | 408/97 |
| 2,039,009 A | | 4/1936 | Lampman | |
| 2,316,724 A | | 4/1943 | Sperry | |
| 2,543,909 A | | 3/1951 | Hatheway | |
| 2,725,766 A | * | 12/1955 | Van Heukelom | 408/81 |
| 2,825,143 A | * | 3/1958 | Polivka | 33/520 |
| 2,881,643 A | * | 4/1959 | Haade | 408/76 |
| 3,007,355 A | * | 11/1961 | Ver Nooy | 408/67 |
| 3,246,132 A | | 4/1966 | Jordan | |
| 3,424,481 A | | 1/1969 | Fulghum | |
| 3,663,042 A | | 5/1972 | Fowler | |
| 3,922,107 A | | 11/1975 | Fowler | |
| 4,365,829 A | | 12/1982 | Fowler | |

(Continued)

FOREIGN PATENT DOCUMENTS

DE 3518496 A * 11/1986

(Continued)

OTHER PUBLICATIONS

INSERTA FITTINGS Co., Lateral Connections Solutions INSERTA TEE, Brochure, 24 pages, Jan. 1, 2003.

*Primary Examiner* — Daniel Howell
(74) *Attorney, Agent, or Firm* — Finnegan, Henderson, Farabow, Garrett & Dunner, LLP

(57) ABSTRACT

A compact assembly for aligning a coring tool relative to a pipe sidewall. The coring tool includes a hollow, cylindrical hole saw mounted to an arbor that has an elongated pilot shaft centered in the hole saw. The assembly is made up of a base plate that is attachable to the pipe sidewall. A tubular sleeve is mounted to the base plate and has a bore diameter sized for receiving the pilot shaft as the hole saw is advanced toward and saws through the pipe wall, and the entire assembly is sized to fit inside the hole saw as the hole saw saws through the pipe sidewall.

16 Claims, 3 Drawing Sheets

U.S. PATENT DOCUMENTS

| | | | |
|---|---|---|---|
| 4,579,486 A * | 4/1986 | Damico | 408/204 |
| 4,706,999 A | 11/1987 | Hynes | |
| 4,759,459 A | 7/1988 | Bailey | |
| 5,111,858 A | 5/1992 | Aittama | |
| 5,129,684 A | 7/1992 | Lawrence | |
| 5,145,216 A | 9/1992 | Valls, Jr. | |
| 5,150,928 A | 9/1992 | Lodder | |
| 5,366,326 A * | 11/1994 | Converse | 408/72 B |
| 5,466,016 A | 11/1995 | Briody | |
| 5,743,682 A * | 4/1998 | Chaney, Sr. | 408/79 |
| 5,826,919 A | 10/1998 | Bravo | |
| 5,871,310 A * | 2/1999 | Mortensen | 408/1 R |
| 6,050,753 A | 4/2000 | Turner | |
| 6,051,795 A | 4/2000 | Fisher | |
| 6,113,156 A | 9/2000 | Bea | |
| 6,224,115 B1 | 5/2001 | Blasch et al. | |
| 6,357,617 B1 | 3/2002 | Kido | |
| 6,508,490 B1 | 1/2003 | Hoffman | |
| 6,761,380 B2 | 7/2004 | Pachciarz | |
| 7,055,867 B2 | 6/2006 | Faller | |
| 7,125,206 B2 | 10/2006 | Turner | |
| 7,513,718 B1 * | 4/2009 | Arnold | 408/1 R |
| 2007/0181342 A1 | 8/2007 | Duncan | |
| 2008/0303270 A1 | 12/2008 | Kief | |

FOREIGN PATENT DOCUMENTS

| | | | |
|---|---|---|---|
| FR | 2236591 A * | 3/1975 | |
| GB | 2024674 A * | 1/1980 | |
| JP | 01240211 A * | 9/1989 | |
| JP | 03196907 A * | 8/1991 | |
| JP | 10217011 A * | 8/1998 | |
| JP | 2001009619 A * | 1/2001 | |
| JP | 2005271230 A * | 10/2005 | |
| JP | 2006297516 A * | 11/2006 | |
| WO | WO 0074884 A1 * | 12/2000 | |

* cited by examiner

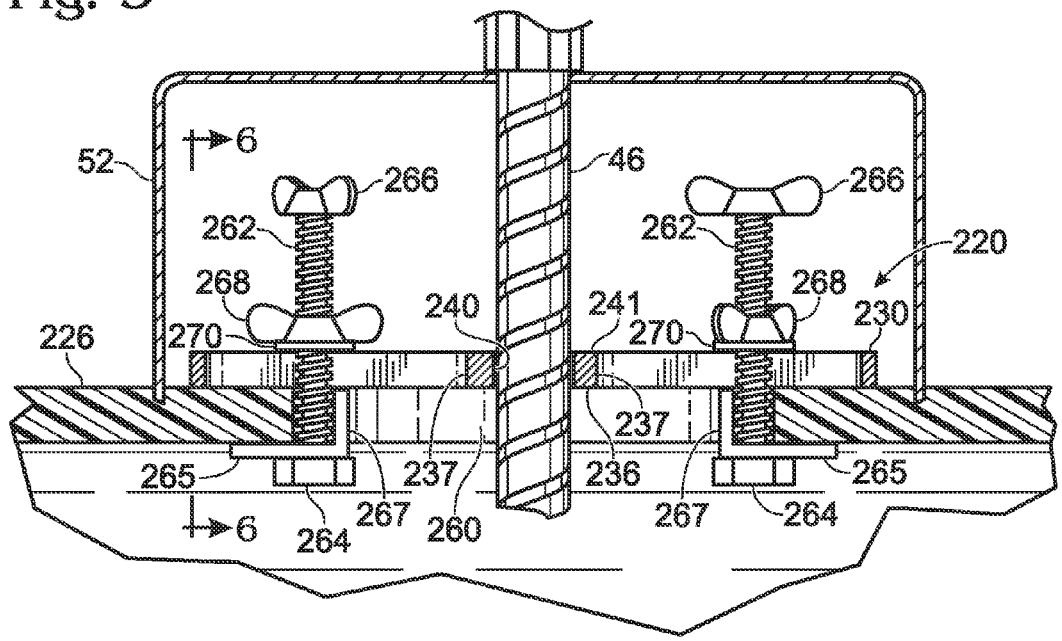
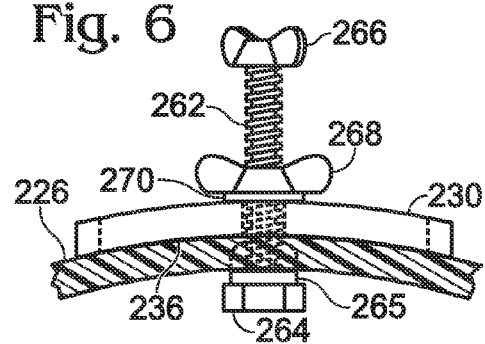
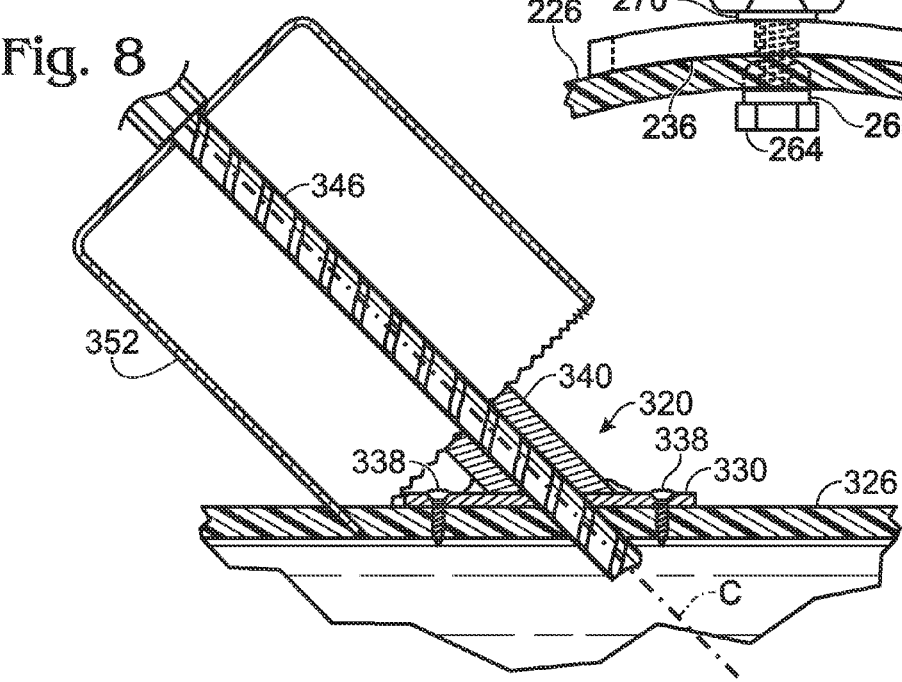

US 8,137,036 B2

CORING TOOL ALIGNMENT SYSTEM

FIELD OF THE INVENTION

This invention generally pertains to what is known as a service connection between a mainline wastewater or storm water pipe and a lateral connecting pipe. More specifically, this invention relates to a system that facilitates precise formation of a hole through the sidewall of the mainline pipe for securely connecting the main and lateral pipe.

BACKGROUND AND SUMMARY OF THE INVENTION

Gravity-type pipe conveyance systems for waste or storm water generally include a mainline pipe or conduit to which service lateral pipes are connected. Many applications call for the connection of the lateral pipes to be made such that the lateral is perpendicular to the mainline pipe. Such service connections are often referred to as "Tee" connections. Alternatively, the service lateral pipe can be connected at an angle (although with the long axis of the lateral always intersecting the long axis of the mainline pipe) and is thus designated, for example, as a "Wye" or 45-Degree service connection.

Service connections often require a hole to be cored through the sidewall of the mainline pipe. The diameter of the cored hole is made slightly larger than the diameter of the service lateral pipe, which has a smaller diameter than the mainline pipe.

One effective service connection system is available from Inserta Fittings Inc., the assignee of the present application (www.insertatee.com), and marketed under the trademark INSERTA FITTINGS. That system comprises a three-piece service connection that is compression fit, without special tooling, into the hole that is cored through the sidewall of a wastewater or storm water mainline pipe. The three-piece service connection comprises a substantially rigid, cylindrical, hollow hub; an elastomeric sleeve; and a stainless steel band. The sleeve fits into a cored hole in the mainline pipe. A leading end of the hub is forcibly inserted into the elastomeric sleeve. After the hub is inserted, a stainless steel band is fastened around the sleeve to secure together the sleeve and the hub. The exposed or trailing end of the hub can be shaped to define a conventional bell component of a bell and spigot joint, and receives the spigot end of the service lateral that is to be connected. This type of service connection may be used with any of a wide variety of pipe types (concrete, PVC, corrugated, etc).

A coring tool is used for coring the requisite hole in the mainline pipe. A coring tool generally includes a hollow, cylindrical hole saw that is mounted to an arbor. The leading end of the arbor comprises a pilot shaft, normally configured as a drill bit, that is centered in the hole saw. The other end of the arbor is mounted to a drill motor or the like for powering rotation of the hole saw to cut through the pipe.

It is important that the coring tool is properly aligned with the mainline pipe to produce a hole that is correctly formed, such that the central axis of the hole intersects the central axis of the mainline pipe. Put another way, the coring tool must be remain securely aligned as the hole saw is advanced through the pipe sidewall. If the tool and resulting hole are not properly aligned, the central axis of the hole will not intersect the long axis of the mainline pipe. Consequently, the misaligned hole made in the sidewall of the mainline pipe will be oblong rather than circular. This can result in attendant misalignment of the service connection with the mainline pipe, hence misalignment of the service lateral, which can lead to leaking and eventual structural failure of the connection.

It is possible for an installer to apply excessive axial force on the service lateral pipe when fitting the spigot end of that pipe into the connection hub. In such an instance, and especially where the cored hole is not quite circular, the excessive force may cause an undesirable amount of penetration of the sleeved end of the hub into the mainline pipe, which can result in interference with the operation and/or inspection of the mainline pipe.

There exists in the prior art complicated tools for engaging a mainline pipe to secure a platform or guide apparatus on a pipe for controlled movement of a connected coring device to form the hole in the pipe sidewall. Such complicated devices usually require many parts and are cumbersome, especially in an environment where a lateral connection is made to, for example, an existing main sewer line that has been exposed, in place, several feet underground. Usually, only a narrow trench is provided for a worker to access the main and make the connection. Moreover, in some construction environments, rainwater, mud, debris, and other elements may make it extremely difficult and/or time consuming for a worker to use conventional mechanisms for controlling coring tools to produce a properly formed hole.

The present invention is directed to a compact and elegantly simplified system for aligning a coring tool to cut a precisely formed hole in a pipe sidewall. Other advantages and aspects of this invention will become clear upon review of the following description and drawings.

BRIEF DESCRIPTION OF THE DRAWINGS

FIG. 5 is a side, cross sectional view of the assembly, like FIG. 4, but showing another alternative embodiment of the assembly that is particularly useful for enlarging a pre-existing hole in the pipe sidewall.

FIG. 6 is a side, cross sectional view taken along lines 6-6 of FIG. 5.

FIG. 8 is a side, cross sectional view of the assembly, like FIG. 4, but showing another alternative embodiment of the assembly.

DETAILED DESCRIPTION OF A PREFERRED EMBODIMENT

Figure 1:
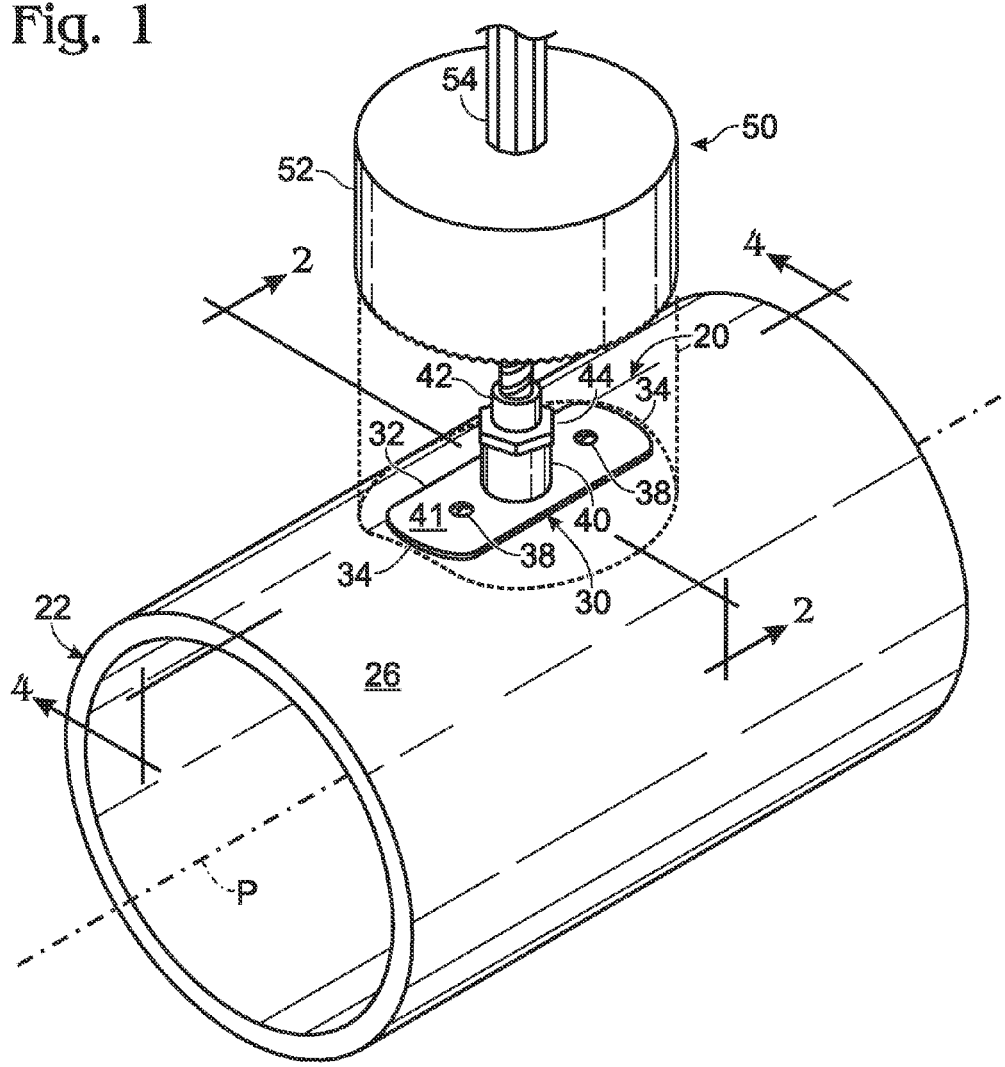
FIG. 1 is a perspective view of an assembly constructed in accordance with one embodiment of the invention and used for easily and precisely aligning a coring tool for forming a hole in the sidewall of a pipe.

An assembly 20 for aligning a coring tool relative to a pipe sidewall 26 is shown in FIG. 1 connected to the mainline pipe 22 as the hole saw 52 of a coring tool 50 is rotated and advanced toward the pipe 22 for cutting a hole in the sidewall 26 of the pipe.

Figure 2:
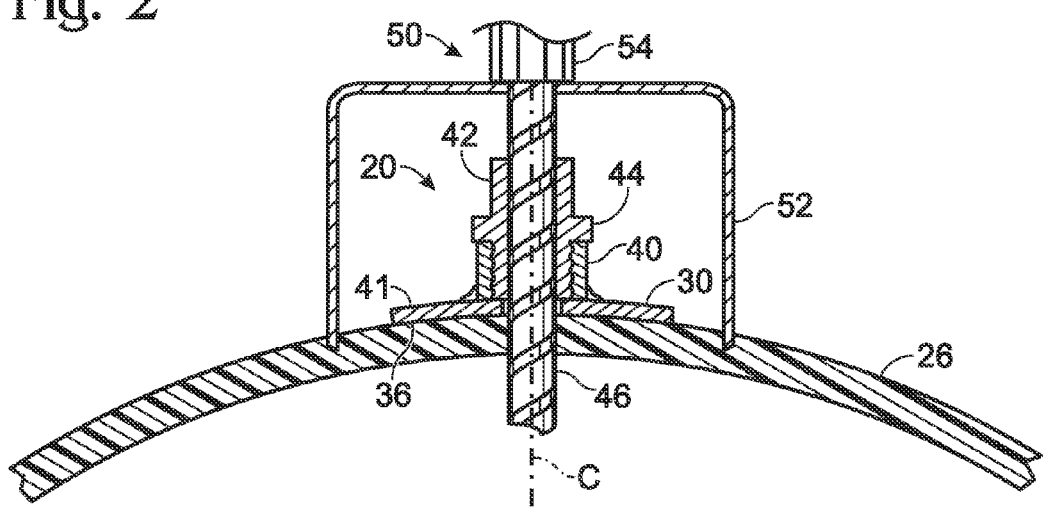
FIG. 2 is a side, cross sectional view of the assembly taken along lines 2-2 in FIG. 1 and showing the hole saw component of the coring tool advancing through the pipe sidewall.
Figure 4:
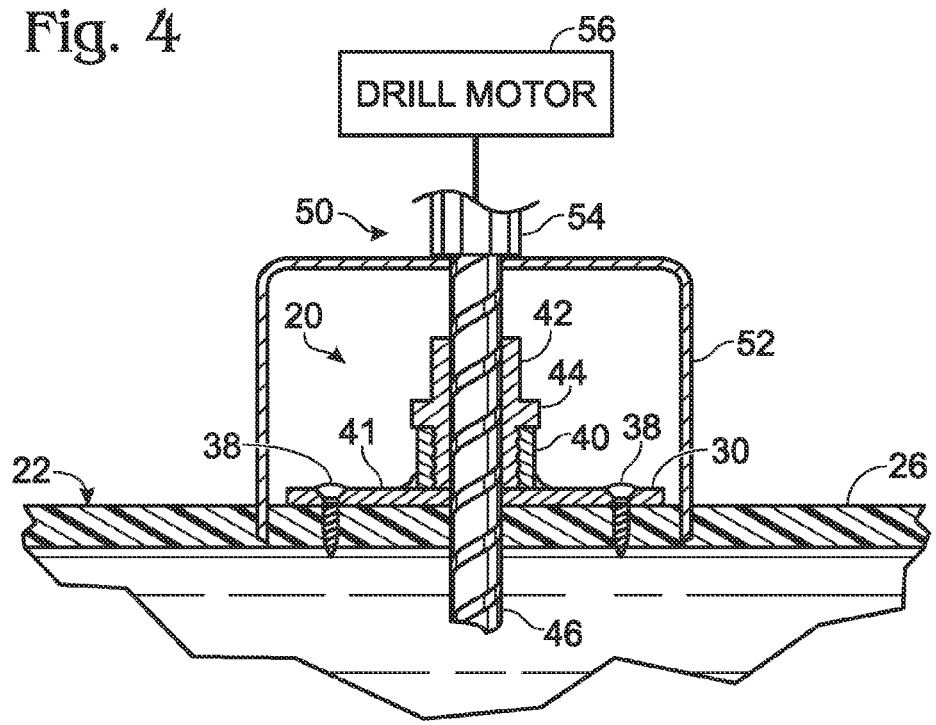
FIG. 4 is a side, cross sectional view of the assembly taken along lines 4-4 of FIG. 1 showing the hole saw component of the coring tool advancing through the pipe sidewall.

With particular reference to FIGS. 1, 2, and 4, the alignment assembly includes a rigid base plate 30 having straight, parallel side edges 32 and rounded end edges 34. As best seen in FIG. 2, the base plate 30 is preferably shaped to conform to the curvature of the exterior of the pipe sidewall 26. Thus, for smooth-sided pipes, such as a PVC sewer pipe as depicted here, the underside 36 of the base plate 30 abuts the exterior of the pipe sidewall 26.

Although a smooth-walled pipe 22 is shown in the figures, it is contemplated that the present assembly is may be employed with corrugated, ribbed and other pipe sidewall shapes and surfaces.

In one embodiment, the base plate 30 may be secured to the pipe with fasteners, such as shown at 38 in FIGS. 1 and 4. The fasteners may be screws that pass through associated clearance apertures formed in the base plate 30. Alternatively, the fasteners 38 may be elongated studs or shanks that protrude from the underside 36 of the base plate to be press-fit into pre-drilled apertures made the pipe sidewall.

A tubular sleeve 40 protrudes from the top surface 41 of the base plate 30. The tubular sleeve is fastened to or integrally formed with the base plate and, in this embodiment, arranged so that its central axis "C" (FIG. 2) will intersect the longitudinal central axis "P" (FIG. 1) of the pipe 22 to which the base plate 30 is fastened.

In this embodiment, the sleeve 40 includes a tubular coupling 42 that is externally threaded to mate with the internally threaded bore of the sleeve (FIG. 2). The coupling 42 includes a flange 44 with flats to enable the coupling to be engaged with a wrench for securely threading together the coupling 42 and the sleeve 40. The bore of the coupling 42 is preferably smooth to receive and guide the pilot shaft 46 (FIGS. 2 and 4) of a coring tool as described more fully below.

Preferably, the coupling 42 is interchangeable with other couplings that have smaller-diameter bores so that a variety of pilot shaft diameters can be readily accommodated by the alignment assembly 20. That is, the guiding action provided by the sleeve 40 and attached coupling 42 can be changed to match any of a variety of pilot shaft diameters found in conventional coring tools. Also, the technique for joining the coupling 42 and sleeve 40 need not be limited to threading. For example, suitable detent, set screw, or quick release mechanisms can be employed for facilitating the interchangeability of the couplings.

It will be appreciated that any of a variety of mechanisms may be employed for varying the bore diameter of the sleeve in addition to the interchangeable coupling just mentioned. Moreover, it is also contemplated that the bore of the sleeve 40 could be smooth to act as a guide for the pilot shaft 46 in the absence of any coupling component. Also, a few alignment assemblies can be provided, each with a particular sleeve bore diameter (for example, ¼ inch; ⅜ inch; ½ inch, etc.), clearly marked to enable a user to readily select the sleeve bore that matches the diameter of the pilot shaft of the particular coring tool in use.

With continued reference to FIGS. 1, 2, and 4, the coring tool 50 usable with the present invention generally includes a hollow, cylindrical hole saw 52 that is mounted to an arbor 54. The leading end of the arbor comprises the above mentioned pilot shaft 46, which is normally configured as a drill bit and is centered in the hole saw 52. The other end of the arbor is mounted to the chuck of a hand-operated drill motor 56 or the like (shown schematically in FIG. 4) for powering rotation of the hole saw to cut through the pipe. The hand-held drill motor is not, and need not be, otherwise connected to pipe.

One technique for using the assembly of the present invention involves first fastening the base plate 30 to the pipe sidewall 26 as discussed above and shown in FIG. 1. As noted, no other pipe engaging mechanisms (chains, platforms etc) are required. The coring tool 50, attached to the drill motor 56, is then manipulated so that the pilot shaft or bit 46 is received in the bore of the coupling 42. The drill motor is operated to rotate the pilot shaft 46 and hole saw 52, and the hole saw is advanced toward the pipe sidewall 26 as the pilot shaft 46 is drilled through the pipe sidewall. (Alternatively, the pilot shaft would pass through a pre-drilled hole in the sidewall that matches and is axially aligned with the bore of sleeve coupling.)

The path of the advancing hole saw 52 is generally shown in dashed lines in FIG. 1. As can be seen there and in FIGS. 2 and 4, the base plate 30 is sized so that it will entirely fit inside of the hollow hole saw 52 as the hole saw saws through the pipe sidewall. The entire assembly, 20, therefore, fits inside of the hole saw 52. Moreover, as is typically the case, the removed core of the pipe sidewall (that is, the circular piece or "coupon" of the sidewall 26 that is freed by the hole saw 52) is temporarily lodged inside of the hole saw until forcibly removed. Consequently, the action of sawing the hole through the pipe sidewall also effectively disengages the entire alignment assembly 20 from the pipe 22 so that the assembly can be retrieved along with the cored part of the pipe. Put another way, once the hole saw operation is complete, the user need not disengage from the pipe any chains, platforms etc for removing the alignment assembly from the pipe before proceeding with making the lateral pipe connection.

Figure 3:
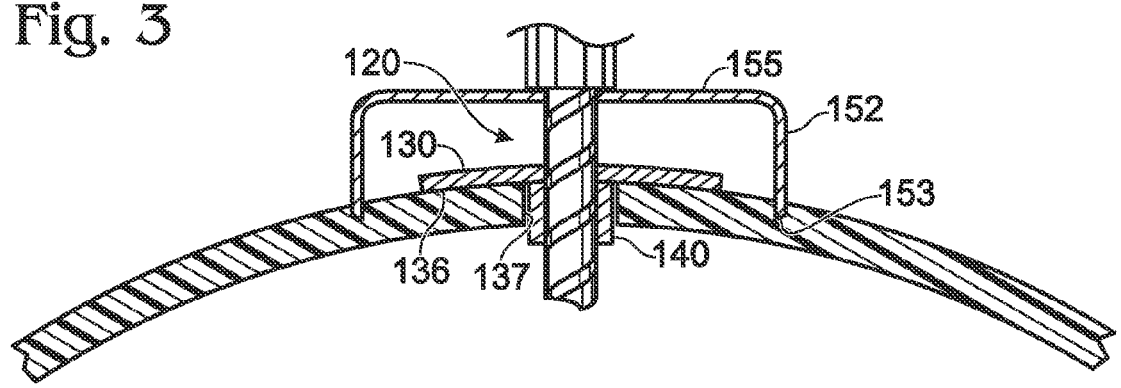
FIG. 3 is a side, cross sectional view of the assembly, like FIG. 2, but showing an alternative embodiment of the assembly.

FIG. 3 depicts an alternative embodiment of the invention for use in instances where a shallow hole saw 152 is used. That is, some hole saws 152 have a relatively short distance between the cutting edge 153 of the saw and its back wall 155, so that a sleeve protruding outwardly from the base plate 130 may prevent the saw from moving completely through the sidewall of the pipe. The embodiment of the alignment assembly 120 shown in FIG. 3 features an inwardly projecting sleeve 140 that protrudes from the underside 136 of the base plate 130 through a pilot aperture 137 formed in the pipe sidewall. It will be appreciated that this arrangement provides sufficient clearance for the advancing back wall 155 of the shallow hole saw 152 to permit the saw to cut entirely through the pipe sidewall 126. Finally, this embodiment (FIG. 3) illustrates use of the assembly 120 employing a smooth-bored sleeve 140 without a coupling, although a coupling could be employed as an alternative.

The assembly 20 depicted in FIG. 1 may also be used in instances where it is desirable to enlarge a previously cored hole in the pipe. For example, as best shown in FIG. 5, it may be desirable to enlarge a previously cored hole 260. Enlargement of the hole 260 may be desirable in instances where the originally cored diameter is simply too small. On the other hand, if the original hole 260 is the correct size but cored in a manner that caused it to be misaligned (that is, so that the central axis of the hole does not intersect the central axis of the pipe), the original hole can be enlarged with the assembly of the present invention so that a correctly aligned hole is produced. After enlargement, the lateral connection to the mainline can be made with the inclusion of a reducer fitting or the like for connecting the lateral pipe to the enlarged hole. In short, the use of the present invention for enlarging a misaligned hole eliminates the problem of patching the original hole or replacing the section of pipe in which the misaligned or undersized hole was made.

Figure 7:
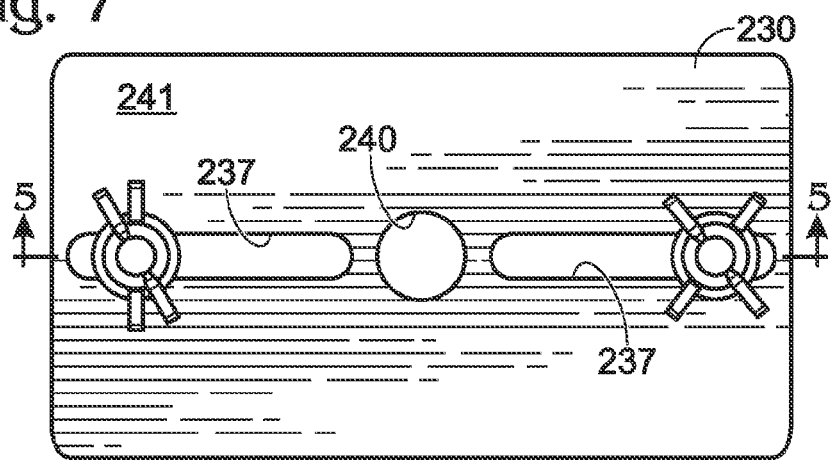
FIG. 7 is a top view of the assembly of FIG. 5, but with the coring tool removed.

FIGS. 5-7 illustrate an embodiment of the alignment assembly 220 that can be used for enlarging the diameter of a previously formed hole 260. As shown there, the base plate 230 includes a central sleeve 240 for guiding a pilot shaft 46 as described above. In this embodiment, the base plate 230 is sufficiently thick to allow the sleeve 240 to be formed as an aperture through the cover plate without protruding therefrom. It is contemplated that a protruding sleeve with or without a coupling could be used in this embodiment, however. Moreover, it is also contemplated that the sleeve 40 in the base plate 30 of the previously described embodiments may also be formed solely from an aperture through the plate, and not protruding therefrom.

The base plate 230 of the FIGS. 5-7 embodiment includes a through slot 237 on each side of the sleeve 240. A bolt 262 with enlarged head 264 is passed through each slot 237 so that the head end of the bolt is disposed on the underside 236 of the base plate 230. A generally L-shaped (in side view, FIG. 5) large washer 265 is fixed to the bolt head 264 so that a leg 267 of the washer 265 protrudes from the bolt head toward the underside 236 of the base plate 230 (FIG. 5). Preferably, the protruding length of the leg 267 is about the same as or slightly less than the thickness of the pipe sidewall 226.

The opposite end of each bolt 262 carries a wing nut 266 that is welded or otherwise fixed thereto. A free wing nut 268 and washer 270 are carried on the bolt shaft between the fixed wing nut 266 and the top surface 241 of the cover plate 230.

To use the alignment assembly 220 for enlarging an existing hole 260, the bolts 262 are moved through the corresponding slots 237 toward the center of the cover plate 230 by an amount such that the head ends 264 of each bolt will be free to extend through the existing hole 260. Next, the bolts 262 are slid apart until they each are adjacent the portion of the pipe sidewall that defines the edge of the existing hole 260. The head 264 and washer 265 are then drawn upwardly (FIG. 5) into engagement with edge of the hole, and the free wing nut 268 and washer 270 are firmly threaded against the top surface 241 of the cover plate 230, thereby effectively clamping the base plate 230 to the pipe sidewall and spanning the existing hole 260. The hole saw 52 is then driven as described above to cut through the pipe and form the enlarged hole.

It will be appreciated that the earlier described embodiments depicted in FIGS. 1-4 can also be used to enlarge a previously cored hole in the pipe sidewall, thus eliminating the need for the clamping mechanisms just described.

As noted above, many applications call for the connection of the lateral pipes to be made such that the lateral is perpendicular to the mainline pipe. Alternatively, the service lateral pipe can be connected at an angle (although with the long axis of the lateral pipe intersecting the long axis of the mainline pipe) and is thus designated, for example, as a "Wye" or 45-Degree service connection. FIG. 8 illustrates an alternative embodiment of the present invention that is adapted to facilitate formation of a precisely aligned hole in the pipe sidewall 326 where the lateral connection is to be inclined at an angle relative to the mainline pipe. In this embodiment, the assembly 320 includes a base plate 330 generally as described above in connection with earlier embodiments, but incorporating a sleeve 340 arranged so that the central axis "C" of the sleeve bore is inclined by the desired angle (for example 45 degrees) of intersection between the lateral and mainline pipe.

Once secured in place (as by fasteners 338) the pilot shaft or bit 346 of the coring tool is received in the bore of the sleeve 340. The drill motor (not shown) is operated to rotate the pilot shaft and hole saw 352, and the hole saw is advanced toward the pipe sidewall 326 as the pilot shaft is drilled through the pipe sidewall. The hole saw 352 is advanced by an amount sufficient to complete cut through the pipe and thereby forming a hole therein that is aligned with the center line "C" of the sleeve bore and intersecting the centerline of the pipe. As noted above, the size of the assembly 320 is such that it will be completely contained within the hole saw that is advanced through the pipe sidewall.

While the foregoing description was made in the context of preferred embodiments, it is contemplated that modifications to that embodiment may be made without departure from the invention as claimed. For example, the structure through which the hole is to be cored need not be limited to pipes. The alignment assembly can be used with any such structure, such as manholes, catch basins, vaults, and electrical boxes, for example, made from any of a variety of materials (concrete, fiberglass, etc). If the surface of the structure is substantially flat, the base plate of the alignment assembly would be made flat to conform to that surface.

The invention claimed is:

1. An assembly for aligning a coring tool relative to a pipe sidewall, wherein the coring tool includes a hollow, cylindrical hole saw mounted to an arbor that has an elongated pilot shaft centered in the hole saw, the assembly comprising:
  a base plate attachable to the pipe sidewall, wherein the base plate includes a clamping device configured to secure the base plate to a wall defined by an existing hole, said clamping device being adjustable to secure the base plate to walls defined by existing holes having different diameters;
  a tubular sleeve mounted to the base plate and having a bore diameter sized for receiving the pilot shaft as the hole saw is advanced toward and saws through the pipe sidewall;
  wherein the base plate is sized to fit inside the hole saw as the hole saw saws through the pipe sidewall.

2. The assembly of claim 1, wherein the base plate is curved to substantially conform to the curvature of the pipe sidewall.

3. The assembly of claim 1, wherein the sleeve protrudes from the base plate.

4. The assembly of claim 3, wherein the sleeve protrudes from the base plate toward the pipe sidewall to which the base plate is attached.

5. The assembly of claim 1, wherein the sleeve is configured to permit varying the bore diameter of the sleeve to receive pilot shafts of various diameters.

6. The assembly of claim 5, further comprising a coupling connected to the sleeve for changing bore diameter of the sleeve.

7. The assembly of claim 1, further comprising a hand-held drill motor secured to the arbor for rotating the hole saw, the drill motor being unconnected to the pipe.

8. A method of aligning a coring tool relative to a pipe sidewall through which a hole is to be made, wherein the coring tool includes a hollow, cylindrical hole saw mounted to an arbor that has an elongated pilot shaft centered in the hole saw, the method comprising the steps of:
  drilling apertures in the pipe sidewall;
  moving a base plate having a sleeve thereon for receiving the pilot shaft into contact with the pipe;
  attaching the base plate to the pipe sidewall with fasteners, wherein the apertures receive the fasteners; and
  advancing the hole saw through the pipe sidewall with the pilot shaft received in the sleeve and so that the base plate moves inside of the hole saw as the hole saw is advanced through the pipe sidewall.

9. The method of claim 8, further comprising securing the arbor to a hand-held drill motor for rotating the hole saw, the drill motor being unconnected to the pipe.

10. A method of aligning a coring tool relative to a pipe sidewall through which a hole is to be made in a manner that enlarges an existing hole formed in the pipe sidewall, wherein the coring tool includes a hollow, cylindrical hole saw mounted to an arbor that has an elongated pilot shaft centered in the hole saw, the method comprising the steps of:

drilling apertures in the pipe sidewall:

moving a base plate having a sleeve thereon for receiving the pilot shaft into contact with the pipe;

attaching the base plate to the pipe sidewall with fasteners, wherein the apertures receive the fasteners; and advancing the hole saw through the pipe sidewall with the pilot shaft received in the sleeve and so that the base plate moves inside of the hole saw as the hole saw is advanced through the pipe sidewall to enlarge the existing hole.

11. The method of claim 10, wherein the attaching step includes spanning the existing hole with the base plate.

12. The method of claim 10, wherein the attaching step includes fastening the base plate to a portion of the pipe sidewall that defines the existing hole.

13. The method of claim 10, further comprising securing the arbor to a hand-held drill motor for rotating the hole saw, the drill motor being otherwise unconnected to the pipe.

14. The assembly of claim 1, wherein the base plate includes a pair of slots, and the clamping device includes adjustable fasteners slidably engaged to the pair of slots.

15. The assembly of claim 14, wherein the adjustable fasteners are configured to slide relative to the pair of slots to accommodate a diameter of the existing hole.

16. The assembly of claim 15, wherein the adjustable fasteners are configured to clamp onto an edge defined by the existing hole.

* * * * *